United States Patent Office 3,311,593
Patented Mar. 28, 1967

3,311,593
POLYURETHANE SOLID PROPELLANTS PREPARED FROM AN ORGANOBORON ISOCYANATE AND A CARBORANE ALCOHOL
Theodore L. Heying, North Haven, Conn., Joyce Ann Reid, Highland Park, N.J., and Samuel I. Trotz, Orange, Conn., assignors to Olin Mathieson Chemical Corporation, a corporation of Virginia
No Drawing. Filed Dec. 1, 1964, Ser. No. 415,863
8 Claims. (Cl. 260—77.5)

This invention relates to organoboron urethanes and to a process for their preparation. More particularly, this invention relates to a process in which, in the first stage, an organoboron dicarboxylic acid halide is reacted with an alkali metal azide to form an organoboron diisocyanate which, in the second stage, is reacted with a carborane diol to yield an organoboron polyurethane. This invention also relates to organoboron urethanes prepared from organoboron diisocyanates and organoboron alcohols.

The organoboron carboxylic acid halides useful in the process of this invention have the formula:

$$R R^a B_{10} H_8 (C R^b C R^c)$$

wherein R and $R^a$ are selected from the group consisting of hydrogen and alkyl of from 1 to 5 carbon atoms, $R^b$ and $R^c$ are each selected from the group consisting of hydrogen and —COX, wherein X is selected from the group consisting of chlorine, bromine, and iodine, and with the proviso that at least one of $R^b$ and $R^c$ is —COX. The compounds of Formula A are generally referred to as carborane-type compounds and in the process of this invention, ortho-, meta- or para-carborane can be employed as starting materials. Organoboron carboxylic acid halides can be prepared by the method set forth in Ager et al., U.S. Patent 3,109,026. For example, the compound $$B_{10}H_{10}[C(COCl)]_2$$

can be prepared by refluxing a mixture of $$B_{10}H_{10}[C(COOH)]_2$$

phosphorus pentachloride, and carbon tetrachloride for about 7 hours while chlorine is bubbled through the reaction mixture.

Alkali metal azides suitable as starting materials in the process of this invention include sodium, potassium, and lithium azides.

Carborane alcohols of the formula:

$$R^d R^e B_{10} H_8 (C R^f C R^g)$$

wherein $R^d$ and $R^e$ are selected from the group consisting of hydrogen and alkyl of from 1 to 5 carbon atoms, $R^f$ and $R^g$ are each selected from the group consisting of hydrogen and —$R^h$OH, wherein $R^h$ is a saturated bivalent hydrocarbon radical of from 1 to 5 carbon atoms and with the proviso that at least one of $R^f$ and $R^g$ is —$R^h$OH.

Organoboron alcohols suitable as starting materials in the process of this invention can be prepared according to the method described in Ager et al., application Ser. No. 801,960, filed March 25, 1959, now U.S. Patent No. 3,166,597, issued January 19, 1965, for Composition and Method. For example, the compound $$B_{10}H_{10}[C(CH_2OH)]_2$$

can be prepared by hydrolyzing the compound:

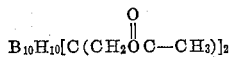

with a methanol solution of potassium hydroxide at a temperature of about 60° C. for about 4.5 hours. The diol is recovered from the reaction mixture, after acidification, by filtration and can be purified by recrystallization from a solvent such as heptane. Carborane alcohols derived from ortho-, meta-, and para-carborane are suitable starting alcohols in this invention.

The reaction proceeds as set forth in the following equations where, for purposes of illustration, the reaction of $$B_{10}H_{10}[C(COCl)]_2$$

and lithium azide to form the corresponding organoboron diisocyanate intermediate, which in the second stage is reacted with the compound $$B_{10}H_{10}(CHCCH_2OH)$$

a carborane alcohol, to form organoboron urethane, is shown:

$$B_{10}H_{10}[C(COCl)]_2 + 2LiN_3 \xrightarrow{\text{benzene}} B_{10}H_{10}[C(NCO)]_2 + 2LiCl + 2N_2$$

$$B_{10}H_{10}[C(NCO)]_2 + B_{10}H_{10}(CHCCH_2OH)$$

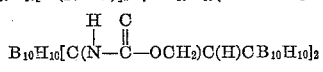

When a carborane diol such as the compound

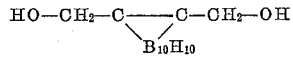

is employed in the second step, the reaction proceeds as follows:

$$nB_{10}H_{10}[C(NCO)]_2 + nB_{10}H_{10}[C(CH_2OH)]_2 \longrightarrow$$

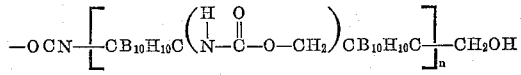

where n is from about 5 to about 50 or more.

The reactions of this invention are carried out in the presence of an inert organic solvent such as benzene, toluene, xylene, pentane, cyclohexane, methyl cyclopentane, dioxane, ethyl acetate, etc. Preferably, the reactions (both stages) are conducted at the reflux temperature of the solvent utilized although temperatures of from 20° C. to about 200° C. can be utilized. At the conclusion of the first stage reaction the unsoluble alkali metal chloride is removed by filtration or by any other convenient method. The overall reaction time generally will be from about 1 hour to about 40 hours or more depending upon the particular reactants and reaction conditions employed. The urethane product can be recovered from the reaction mixture by evaporating of the solvent under reduced pressure or by any other suitable method, such as by extraction, etc. The crude urethane product can be recrystallized from solvents such as methyl alcohol, acetone, etc., to yield the pure urethane material, if desired. The molecular weights of the polyurethane products of this invention will vary from about 1500 to about 15,000.

The novel products of this invention can be utilized as fuels in solid propellants. The solid products of this invention when incorporated with suitable oxidizers, such as ammonium perchlorate, potassium perchlorate, sodium perchlorate, ammonium nitrate, etc. yield solid propellants suitable for rocket power plants and other jet propelled devices. Such propellants burn with high-flame speeds, have high heats of combustion and are of the high specific impulse type. Probably the single most important factor in determining the performance of a propellant charge is the specific impulse, and appreciable increases in performance will result from the use of the higher specific impulse materials. The products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as the pyrotechnic-type igniter, and are mechanically strong enough to withstand ordinary handling.

The method of this invention is illustrated in detail in the following example which is to be considered not limitative:

EXAMPLE I

A total of 5 grams of $$B_{10}H_{10}[C(COCl)]_2$$

was dissolved in 30 ml. of benzene and charged to a small flask. A solution of 3 grams of sodium azide in 10 ml. of water was added and stirring was commenced. After the reaction mixture had been stirred for 17 hours, a small amount of water was added instead to bring about separation of an aqueous and a benzene layer. After separation, 40 ml. of benzene was added to the organic layer which was dried over magnesium sulfate, and filtered into a flask. A water condenser leading to a gas measuring apparatus was connected to the flask and the benzene solution was heated at reflux temperature for a period of 26 hours during which time 515 mls. of gas (S.T.P.) was evolved. A total of 70 milliliters of the carborane diisocyanate in benzene remained.

A total of 31.5 milliliters of the above-described benzene solution of the diisocyanate product was added to a flask containing 2.5 grams of the compound $$B_{10}H_{10}[C(CH_2CH_2OH)]_2$$

The flask was equipped with a condenser which was capped with a calcium chloride tube. Heat was applied to the reaction mixture and it was refluxed with stirring for 16 hours. After cooling, the benzene solution was decanted in order to remove from it a small amount of solid material which had precipitated during the refluxing period. The benzene was removed by heating at reduced pressure yielding a resinous yellow polyurethane (as confirmed by its infrared spectrum) which exhibited a softening point of 35–40° C. The molecular weight was determined by the light scattering procedure and found to be 5,000.

The boron-containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate, and the like. In formulating a solid propellant composition employing one of the materials produced in accordance with the present invention, generally from 10 to 35 parts by weight of boron-containing material and from 65 to 90 parts by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin or polymer such as the polyurethane type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a resin such as that mentioned previously or a pre-polymer of the resin, the proportions being such that the amount of resin is about 5 to 10 percent by weight based on the weight of oxidizer and boron compound. The ingredients are thoroughly mixed with the simultaneous removal of solvent, and following this the solvent-free mixture is molded into the desired shape, as by extrusion. Thereafter, the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

What is claimed is:

1. A process for the preparation of a urethane which comprises (A) reacting, in the presence of an inert organic solvent, an azide of the formula:

$$MN_3$$

wherein M is an alkali metal selected from the group consisting of sodium, lithium and potassium, with a compound of the formula:

$$B_{10}H_{10}(CR^bCR^c)$$

wherein $R^b$ and $R^c$ are each selected from the group consisting of hydrogen and —COX, wherein X is selected from the group consisting of chlorine, bromine, and iodine, and with the proviso that at least one of $R^b$ and $R^c$ is —COX, to form an alkali metal halide and an organoboron isocyanate, (B) removing the said alkali metal halide from the reaction mixture, (C) reacting the said organoboron isocyanate with a carborane alcohol of the formula:

$$B_{10}H_{10}(CR^fCR^g)$$

wherein $R^f$ and $R^g$ are selected from the group consisting of hydrogen and —$R^h$OH, wherein $R^h$ is a saturated bivalent hydrocarbon radical of from 1 to 5 carbon atoms, and with the proviso that at least one of $R^f$ and $R^g$ is —$R^h$OH, to yield a urethane product, and (D) recovering the said urethane product from the reaction mixture.

2. The process of claim 1 wherein the said azide is sodium azide.

3. The process of claim 1 wherein the said inert organic solvent is benzene.

4. The process of claim 1 wherein the said compound is:

$$B_{10}H_{10}[C(COCl)]_2$$

5. The process of claim 1 wherein the said carborane alcohol is:

$$B_{10}H_{10}[C(CH_2CH_2OH)]_2$$

6. The process of claim 1 wherein the said azide is sodium azide, the said inert organic solvent is benzene, the said compound is:

$$B_{10}H_{10}[C(COCl)]_2$$

and the said carborane alcohol is $$B_{10}H_{10}[C(CH_2CH_2OH)]_2$$

7. A polyurethane consisting essentially of recurring units of the formula:

$$-\left[CB_{10}H_{10}C\left(\overset{H}{\underset{|}{N}}-\overset{O}{\underset{\|}{C}}-O-R^h\right)CB_{10}H_{10}C\right]-$$

wherein $R^h$ is a saturated bivalent hydrocarbon radical having 1 to 5 carbon atoms.

8. The polyurethane of claim 7 wherein $R^h$ is

—$CH_2CH_2$—

References Cited by the Examiner

UNITED STATES PATENTS

| | | | |
|---|---|---|---|
| 2,945,841 | 7/1960 | Aires | 260—77.5 |
| 3,147,296 | 9/1964 | Fein et al. | 260—453 |
| 3,165,481 | 2/1965 | Brotherton et al. | 260—2 |
| 3,217,031 | 11/1965 | Fein et al. | 260—606.5 |
| 3,247,257 | 4/1966 | Green et al. | 260—606.5 |

LEON J. BERCOVITZ, *Primary Examiner.*

REUBEN EPSTEIN, *Examiner.*

L. A. SEBASTIAN, *Assistant Examiner.*